May 9, 1933. E. C. WHITE 1,908,202
DETERMINATION OF CARBON MONOXIDE IN A GAS MIXTURE
Filed April 1, 1930 2 Sheets-Sheet 2
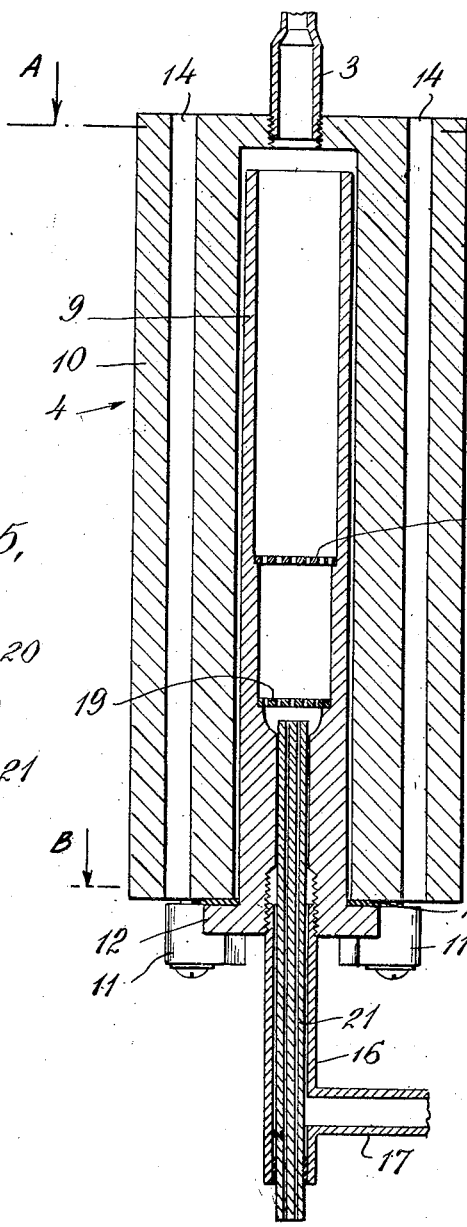
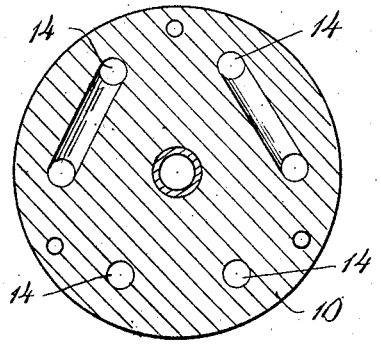
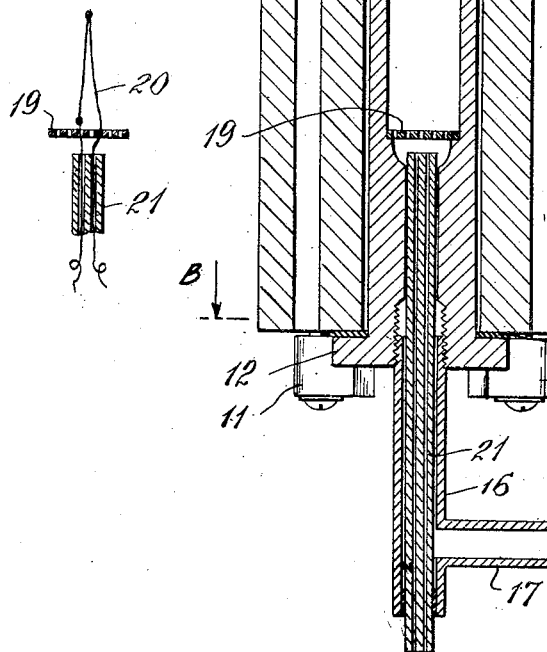
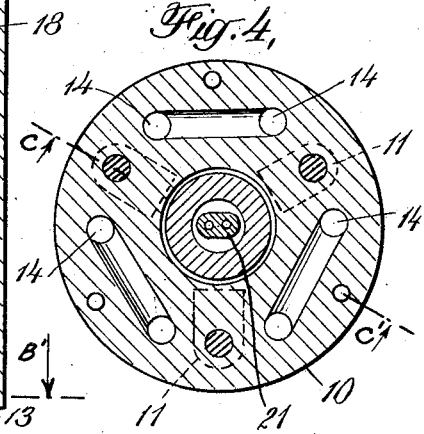
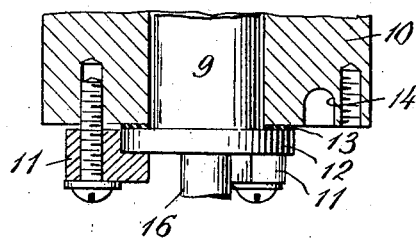
INVENTOR
ERNEST C. WHITE
BY W. R. Gawthrop
ATTORNEY Patented May 9, 1933

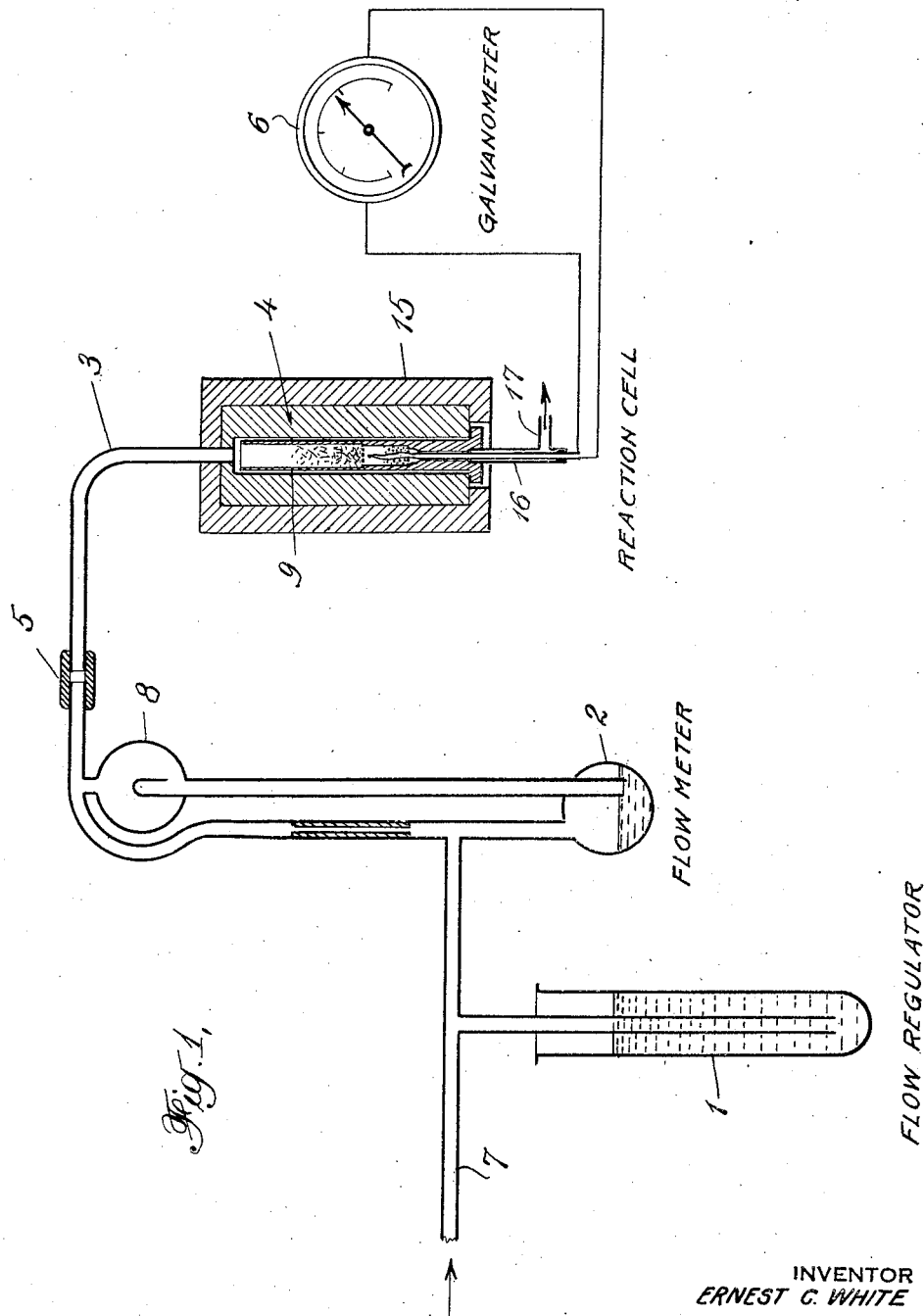

1,908,202

UNITED STATES PATENT OFFICE

ERNEST C. WHITE, OF CHARLESTON, WEST VIRGINIA, ASSIGNOR, BY MESNE ASSIGNMENTS, TO E. I. DU PONT DE NEMOURS & COMPANY, OF WILMINGTON, DELAWARE, A CORPORATION OF DELAWARE

DETERMINATION OF CARBON MONOXIDE IN A GAS MIXTURE

Application filed April 1, 1930. Serial No. 440,699.

This invention relates to gas analysis and more particularly to apparatus for the automatic analysis of carbon monoxide in gaseous mixtures containing the same.

It is the object of the present invention to provide an apparatus for the automatic and continuous determination of carbon monoxide in gaseous mixtures by measuring the heat developed upon catalytically converting the carbon monoxide to methane by reaction of hydrogen.

Other objects and advantages of the invention will be apparent as it is better understood by reference to the following specification and to the accompanying drawings in which—

Figure 1 is a diagrammatic representation of an arrangement of apparatus suitable for the purpose.

Figure 2 is a sectional detailed view of the reaction cell, and Figures 3–6 inclusive are sectional views of details of the cell.

Referring to Figure 1 the principal parts of the apparatus are the reaction cell (4) in which the carbon monoxide is reacted catalytically with hydrogen to form methane; the galvanometer (6) for recording electrically the heat produced by the reaction as measured by a thermocouple connected to the galvanometer; and a flow regulator (1) and a flow meter (2). The gaseous mixture to be analyzed, containing carbon monoxide and at least sufficient hydrogen to convert the latter to methane, is admitted to the apparatus by way of the tube (7) after preliminary purification, if necessary, as, for example, removal of carbon dioxide, if any be present, by absorption in caustic soda. The flow regulator (1), which serves to maintain a uniform flow of gas, consists of a side-arm blow-off tube immersed in a vessel containing light mineral oil, the depth of which is adjustable by any suitable means so as to maintain a given setting on the flow meter (2). The latter is of the usual capillary type but is provided with a safety trap (8) to prevent the manometric liquid (mineral oil) from blowing over into the gas train. Selection of a suitable capillary is guided by previous estimate of the rate of flow that will be required.

The gas leaving the flow meter enters a moderate length, say 75 centimeters, of small copper tubing (3) connected to the top of the reaction cell (4). The glass to copper connection may thus be made with rubber tubing (5) without danger of overheating.

Referring to Figure 2 in which the details of construction of the reaction cell (4) are shown, the cell consists of a metal cartridge (9) fitted into a chamber formed within the hollow massive metal cylinder (10). The cartridge is held in place by three dogs or lugs (11) (see Figures 4 and 6) overlapping the shoulder (12) at the lower end of the cartridge. An asbestos gasket (13) between this shoulder and the base of the cylinder serves to effect a gas-tight connection. The massive metal cylinder is electrically heated, preferably by a resistance element (not shown) which is threaded through a number of longitudinal channels (14) symmetrically disposed with respect to the axis of the cylinder. The latter is also preferably provided with external lagging (15) (Figure 1). A lagged brass heater (10), such as shown, 6″ in length, 2½″ outside diameter, and ⅞″ inside diameter, acquires an internal temperature of about 400° C. with a consumption of about 185 watts, and hence for use with 110 volt current the heating element should have a resistance of about 65 ohms.

The cartridge is preferably made of brass carrying a threaded outlet tube (16) of standard ⅛″ pipe with a side-arm (17) through which the gases are withdrawn from the apparatus. By enlarging the bore of the cartridge there is formed about 7.5 centimeters from the upper end a ledge for supporting a perforated metal disc (18) upon which may be placed a bed of granular material to serve the double function of assuring a uniform preheating of the gas and also removing impurities, such as, for example, sulphur. Various materials may be used for this purpose depending upon the impurity to be removed, for instance a granulated reduced mixture of copper and zinc oxides is effective for the removal of sulphur compounds. A second ledge, about three centimeters below the first, supports a perforated porcelain disc (19) on which is disposed a thin layer of a catalyst which is active for the reaction of carbon monoxide and hydrogen to form methane. It is especially desirable to employ a catalyst which is active at a relatively low temperature and for this purpose I have found especially effective a catalyst prepared as follows:

Crush pumice stone and screen to 8–14 mesh, wash with boiling hydrochloric acid until free from iron and then with boiling distilled water until free from chlorides. After drying at 200° C. stir 100 parts at that temperature into a boiling solution of 50 parts of nickel nitrate and 2.6 parts of cerium nitrate, all of which should be free from sulphur, halogens, and other contact poisons, in 70 parts of distilled water. After absorption is complete remove the pumice from the solution and calcine it at 400° C. until the nitrogen oxides have been expelled. The catalyst is subjected to preliminary reduction by treatment with hydrogen for about an hour at from 350–400° C.

A thermal electric element (20), the arrangement of which, with respect to the porcelain disc (19), is shown in Figure 5, may consist of one or more couples, depending upon the range of gas concentrations to be measured. For a gas containing 3% or more of carbon monoxide by volume a single couple of alumel-chromel or constantan-chromel is sufficient. The cold junction is located about 2.5 centimeters above the hot junction, which is at the porcelain disc. For concentrations of the order of 1% a 3-couple thermopile should be used. The thermocouple is supported by its two lead wires which are held in place by the close-fitting holes of the porcelain disc (19) and by a length of two-hole flat porcelain tubing (21) fitting tightly in the outlet pipe and cemented to it at its lower end.

The galvanometer or millivoltmeter (6) should have a range of ten millivolts or less for full scale deflection. Any standard pyrometer having no cold junction compensation may be adapted for this use.

Figures 3 and 4 are sectional views taken on AA' and BB' respectively and Figure 6 is a section on CC'.

In using the apparatus the electric current employed for heating the reaction cell is adjusted so as to maintain a temperature of from 300–400° and, the galvanometer having been calibrated, the carbon monoxide content of the gaseous mixture passing through the apparatus may be read directly from the galvanometer.

Since the apparatus is not designed for absolute measurements, it must be calibrated empirically. A convenient method of calibration consists in making runs with one or more gas mixtures of known carbon monoxide content. After a charge of 1 to 1.5 cubic centimeters of 8–14 mesh methanation catalyst has been placed on the porcelain disc the metal disc is inserted and the remaining upper portion is filled with a suitable purifier mass. The cartridge is then inserted and secured in place by tightening the dogs or lugs (11). After the current is turned on, several hours are required for the temperature to reach its maximum. The catalyst is subjected to preliminary reduction by means of hydrogen, as indicated above, this taking place quite rapidly above 350° C. Since, within the range of flows not exceeding that at which the activity of the catalyst is insufficient to effect complete reaction, the temperature rise increases with increasing flow, it is most convenient to set the rate of flow at such a value that the gas of known composition will produce the desired deflection of the millivoltmeter. It is advisable to determine first, however, what deflection, if any, is produced by a similar gas containing no carbon monoxide and to adjust the meter of the instrument so that such a gas gives a reading of zero on the scale. This "inert" gas is best obtained by causing the standard reference gas, used for calibration, to pass through a suitably heated methanation catalyst prior to entering the apparatus, the carbon monoxide being removed in this manner. Though this procedure of determining and compensating for the "zero error" of the analysis cell is not essential in cases where the carbon monoxide concentration in practice will vary through a very limited range, it is almost indispensable for the low concentration gases where a complete calibration curve is required. After the zero adjustment has been made at the approximate rate of flow to be used, the standard gas of known composition is again introduced and the millivoltmeter reading is noted. If it is necessary to change the rate of flow in order to give a predetermined reading on millivoltmeter scale, the zero adjustment should be tested for the new rate. A straight line relationship may be assumed for the ratio of millivolts to carbon monoxide concentration.

Although in practice it is advisable to test the accuracy of the apparatus with standard gases at frequent intervals, it is seldom found necessary to correct the calibration even after months of service, but the adjustment is easily accomplished by setting the gas flow at a slightly different rate.

Aside from poisoning of the catalyst there are two factors that may introduce errors in the results indicated by the apparatus, namely temperature variations and the presence of other oxygen-containing gases in addition to the carbon monoxide. In normal operation the mean temperature of the cell does not vary sufficiently to introduce appreciable errors. The junctions between the thermoelement wire and the proper extension leads should be close together and insulated to prevent the introduction of other thermoelectric potentials in the circuit. Gases containing carbon dioxide should be scrubbed with caustic before being analyzed. Traces of elemental oxygen that might be present would be removed by the purifier catalyst. The effect of traces of water-vapor is apparently negligible.

The apparatus described is useful in the continuous and automatic analysis of carbon monoxide in a variety of gaseous mixtures including especially hydrogen containing carbon monoxide. Where it is desired to determine the carbon monoxide in gases that do not contain hydrogen or those that contain less hydrogen than is required for conversion of the carbon monoxide to methane, it is necessary to make an addition of hydrogen to provide the necessary stoichiometric proportion.

Various changes may be made in the apparatus described without departing from the invention or sacrificing any of the advantages thereof.

I claim:

1. The method of quantitatively determining the amount of carbon monoxide in a gas mixture containing the same, which comprises passing said gas mixture, together with hydrogen in amount at least sufficient to react with the carbon monoxide to form methane, over a heated methanation catalyst at a rate adapted to permit conversion of all the carbon monoxide to methane, and measuring the amount of heat evolved by the methanation reaction.

2. The method of quantitatively determining the amount of carbon monoxide in a gas mixture, which comprises adding hydrogen thereto in an amount sufficient to give a $H_2:CO$ ratio of at least 3:1, passing the resultant mixture over a heated methanation catalyst at a rate adapted to permit conversion of all the carbon monoxide to methane, and measuring the amount of heat evolved by the methanation reaction.

In testimony whereof, I affix my signature.

ERNEST C. WHITE.